United States Patent [19]

Weihe

[11] 4,442,605
[45] Apr. 17, 1984

[54] DEAD RECKONING NAVIGATION INSTRUMENT

[76] Inventor: Vernon I. Weihe, 4133 33rd Rd., Arlington, Va. 22207

[21] Appl. No.: 390,399

[22] Filed: Jun. 21, 1982

[51] Int. Cl.³ .................... G01C 21/20; G06G 1/16
[52] U.S. Cl. .................................... 33/1 SD; 33/431; 33/DIG. 1; 235/61 NV
[58] Field of Search .................. 33/1 C, 1 CC, 1 SB, 33/1 SD, 431, DIG. 1; 235/61 NV

[56] References Cited

U.S. PATENT DOCUMENTS

| | | | |
|---|---|---|---|
| 1,930,478 | 10/1933 | Jones | 33/1 SD |
| 2,114,652 | 4/1938 | Dalton | 33/1 SD |
| 2,826,959 | 3/1958 | Schneider | 33/DIG. 1 |
| 3,013,337 | 12/1961 | Hurwitz | 33/431 |
| 3,514,582 | 5/1970 | Sanderson | 33/1 SB |
| 4,120,091 | 10/1978 | Borgato | 33/1 SD |
| 4,347,669 | 9/1982 | McEwen | 33/431 |

Primary Examiner—Richard R. Stearns
Attorney, Agent, or Firm—Nicholas J. Cafarelli

[57] ABSTRACT

A dead reckoning navigation instrument, consisting of magnetically connected components, for navigation watercraft between known waypoints. A trackline on a transparent trackline plate connects the waypoints. A direction line on a transparent direction line plate, oriented perpendicular to the trackline is used to define the next waypoint along a route. A transparent overlay plate provides the speed and distance traveled scales for the dead reckoning navigation function.

3 Claims, 6 Drawing Figures

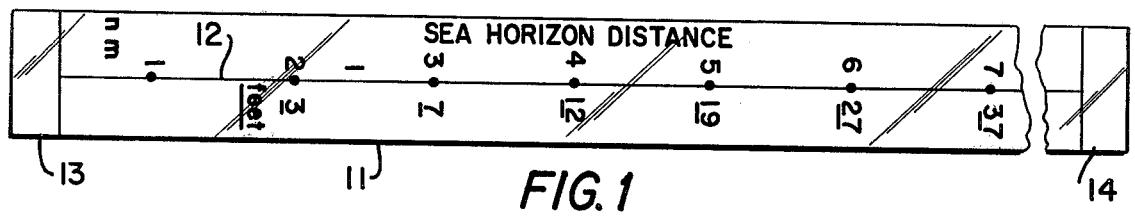
FIG. 1
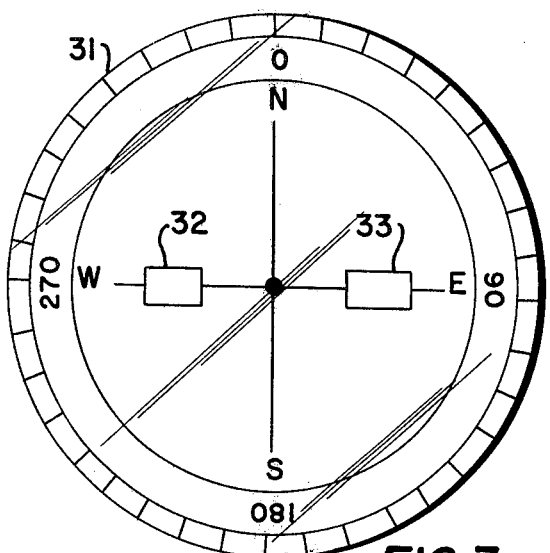
FIG. 3
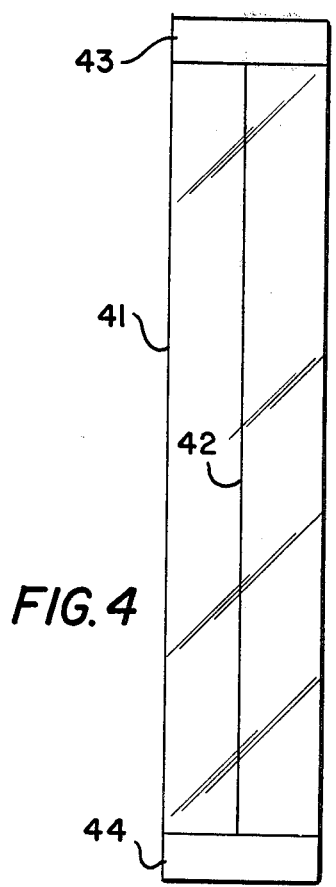
FIG. 4
FIG. 5
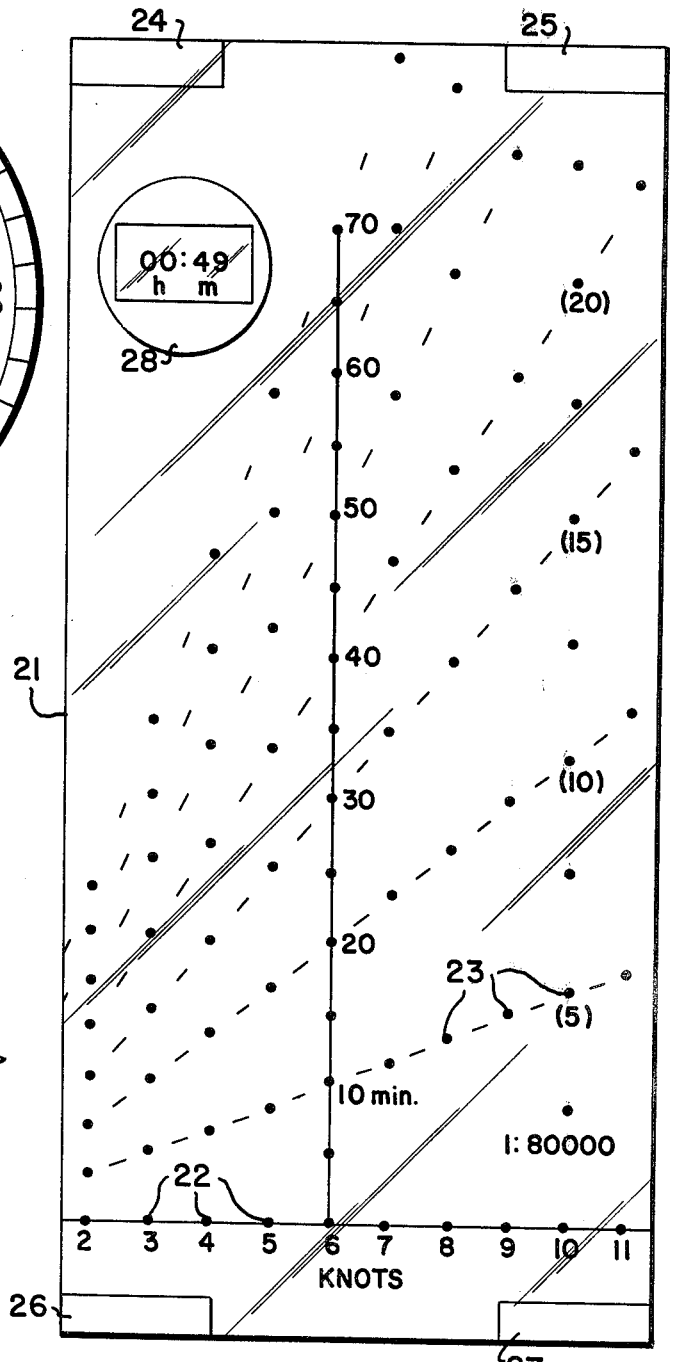
FIG. 2

DEAD RECKONING NAVIGATION INSTRUMENT

REFERENCES

Manual devices that could be used for dead reckoning navigation are described in U.S. Pat. Nos. 3,013,337, 3,059,339, 3,683,506, 3,863,347, and 4,283,861. While those devices can serve a useful dead reckoning navigation function, none can provide this function with the austere and efficient combination of components that constitutes my invention.

BACKGROUND OF INVENTION

This invention relates to dead reckoning navigation instruments, and in particular to the type that is manually operated. Dead reckoning concerns the applications of elapsed time, speed and direction to determine current position relative to initial position. Fully automatic and semiautomatic instruments for dead reckoning are available in many forms, particularly with the advent of low cost computers and pocket calculators. However, these automated instruments normally do not provide the vast amount of useful navigation information that appears on navigation charts, such as water depth at low tide. General purpose devices, such as grease pencils, dividers, protractors and parallel rules, currently are used with the navigation chart to perform the dead reckoning operation. The user selects and draws a course-line on the navigation chart, using lead or grease pencil. From this line, via parallel rules, moves are made across the chart to a fixed compass-rose where the specific compass course to steer is determined to agree with the aforementioned course line direction. Using dividers and mileage or latitude scales on the chart as reference, the course-line is marked at intervals to create an ad hoc distance scale. With various one, two or three arm protractors the scales are already supplied on one or more of the "arm" portions. More than one arm with such a protractor facilitates determining position by means of the angle(s) between the craft and two or three fixed visually sighted objects. Two and three arm protractors facilitate position fixing, but not dead reckoning per se. Furthermore, these conventional general purpose elements, and procedures for their use, are not practical in many environmental conditions, and under many user workload situations.

BRIEF DESCRIPTION OF DRAWINGS

FIG. 1 shows a top view of a transparent trackline plate that connects chart way points.

FIG. 2 shows a top view of a transparent overlay plate having markings that relate speed, time and distance traveled.

FIG. 3 shows a top view of a transparent compass rose.

FIG. 4 shows a top view of a transparent direction line plate that, when oriented perpendicular to the transparent trackline plate, locates significant visible progress points.

FIG. 5 shows a top view of an opaque magnetic marker that is used to locate significant markings on the transparent overlay plate.

DETAILED DESCRIPTION OF INVENTION

Figure 6:
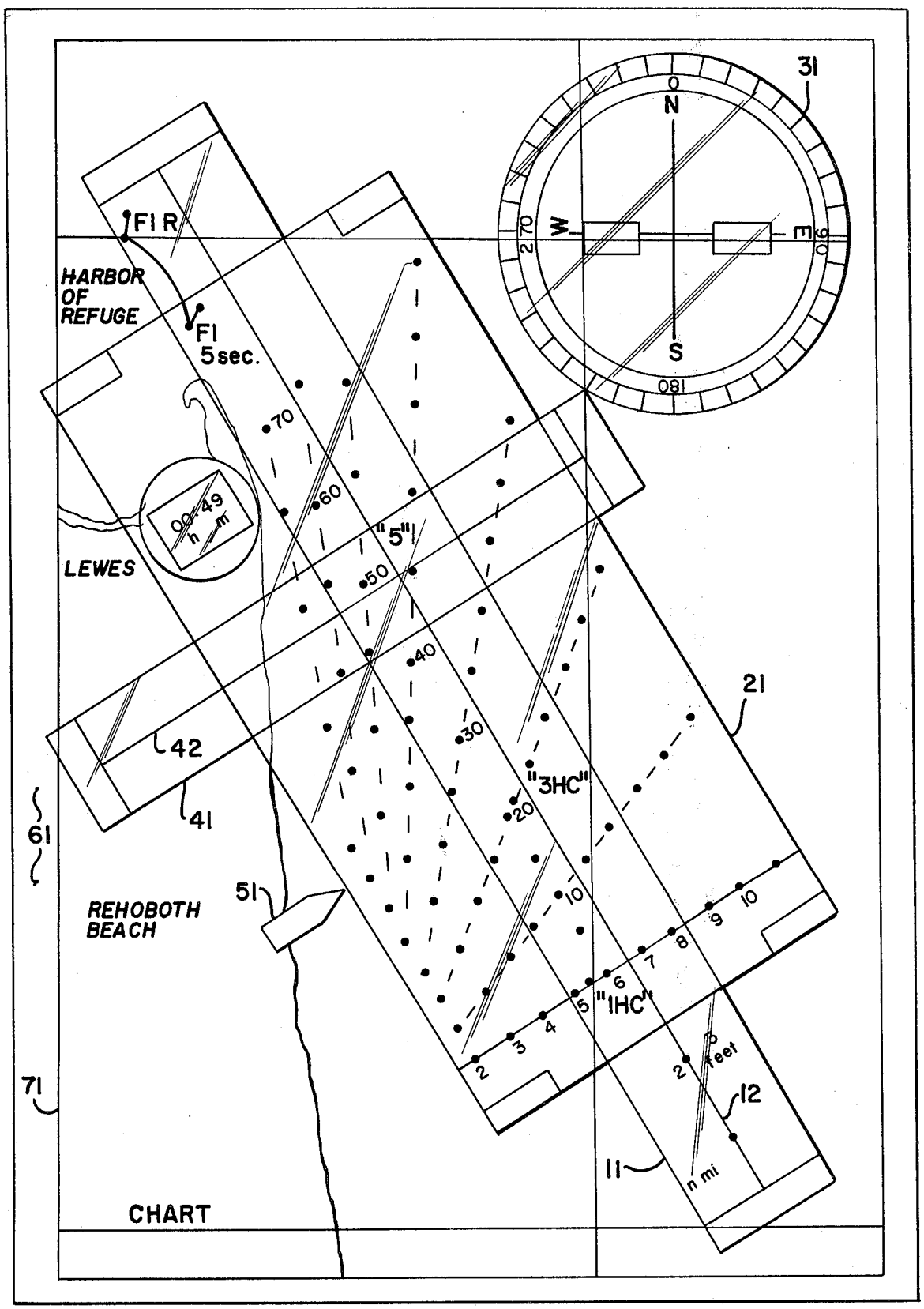
FIG. 6 shows the previously illustrated parts in combination for dead reckoning navigation.

Referring to FIG. 1, there is shown a top view of a transparent trackline plate 11 having a trackline 12 permanently marked thereon, and having magnets 13 and 14 attached thereto. Transparent trackline plate 11 also contains a scale which relates the 'distance to the horizon' to the height of an object for the chart scale in use. The distance to the sea horizon for the observer's height of eye must be added to the said object height in order to estimate the total distance at which the sea surface cuts the line of vision making the object not visible. The thickness of this transparent trackline plate 1 is not critical, but a suggested thickness is about 1/32 of an inch.

Referring to FIG. 2, there is shown a top view of a transparent overlay plate 21, having speed dots 22 permanently marked thereon. Straight line rows of time dots, such as time dots 23, also are permanently marked thereon. Magnets 24, 25, 26, and 27 are either attached to, or form an integral part of, the transparent overlay plate 21. Time counter 28 also is attached to, or forms an integral part of, the transparent overlay plate 21. Other markings on transparent overlay plate 21 include the identity of chart scales for use with this plate. The thickness of this transparent overlay plate 21 is not critical, but a suggested thickness is about 1/32 of an inch.

Referring to FIG. 3, there is shown a top view of a transparent compass rose 31, having magnets 32 and 33 attached thereto, its thickness being not critical but a suggested thickness being about 1/32 of an inch.

Referring to FIG. 4, there is shown a top view of a transparent direction line plate 41, having a direction line 42 permanently marked thereon, and having magnets 43 and 44 attached thereto. The thickness of this transparent direction line plate is not critical, but a suggested thickness is about 1/32 of an inch.

Referring to FIG. 5, there is shown a top view of a magnet marker 51, its thickness being not critical but a suggested thickness being about 1/32 of an inch.

Referring to FIG. 6, there is shown the parts identified by the previous illustrations arranged in combination to perform dead reckoning navigation. The parts are configured in layers on a ferrous base plate which is a ferrous metal sheet about 1/32 of an inch thick, with dimensions suitable for placing on a small table or on one's lap. The components previously described are combined in layers on the ferrous plate as follows:

1. The first layer is navigation chart 71, which is laid on, clipped onto, or in any convenient manner affixed, to ferrous base plate 61;
2. The second layer consists of transparent trackline plate 11, and magnetic marker 51;
3. The third layer is transparent overlay plate 21;
4. The fourth layer is transparent direction line plate 41.

This invention can be best understood by showing its application to a representative navigation problem. Referring to FIG. 6, the trackline plate 11, with trackline 12 used as reference, is laid from whistle "1HC" to a point off the jetty of the Harbor of Refuge. It is held in place by magnetic elements at each end which adhere to a ferrous plate beneath the chart.

The transparent compass rose plate 31, which is magnetically held to the ferrous base plate and thus to navigation chart 71, is used to determine the magnetic compass bearing of said trackline, and is then set aside. The magnetic bearing of North is read from the compass rose printed on the chart. The reading of transparent compass rose plate 31 is made at the point on said direction line 12 which intersects with a latitude or longitude line of the chart. The center of transparent compass rose plate 31 is placed at the intersection of trackline 12 of transparent trackline plate 11, and a vertical or horizontal line of navigation chart 71. In the illustration the vertical line which passes through whistle "1HC" defines such a point where it intersects the direction line at 7 elapsed minutes.

Transparent overlay plate 21 is the central element of the system. It is shown positioned in time with its vertical dimension set to "time zero" at the most recent best known position of the user's craft. In the illustration this position is opposite whistle "1HC".

Laterally the transparent overlay plate 21 is positioned at the best known average speed of the user's craft, which in the illustrated case is approximately 6.6 knots.

With the proper vertical and horizontal positioning of transparent overlay plate 21, the user has displayed over his chart the expected position of his craft, in this case, for the next 70 minutes of time. At frequent intervals along the course the chart shows what the depth should be at mean low water. The user must add estimated values above mean low water for his time period of transit.

At the initial zero time setting the time counter 28 in the upper left corner is also set at zero and is started, so that it will indicate the elapse of time. If this time-piece has an alarm, it too can be set to alarm at any future time at which the alarm could serve a useful navigation purpose. In the illustration time 00:49 is shown, which is the illustrated craft position 49 minutes of time after initial zero setting, and shows the craft position opposite buoy "5" flashing green.

Transparent overlay plate 21 is illustrated here as covering from 1½ to 11½ knots and to 70 minutes of elapsed time from zero. These values can be set over a wide range to suit various user's needs, craft speeds, chart scales, and the chart board dimensions. It can be used with 1:80,000 scale charts, or by halving the time scale (not shown in the drawings) with 1:40,000 scale charts. At 6 knots, each 10 minutes of elapsed time is one nautical mile. In addition to or as a substitute for time, the distance log can be used to note progress, in which case the nautical mile scale becomes the progress reference.

The direction line 42 on transparent direction line plate 41 is shown placed and magnetically held in position to identify a significant progress point for the user.

In this case it is set at 00 hr. 49 min., describing a point opposite buoy "5".

Magnetic marker 51 is held in place at a set position on navigation chart 71 by adhering to the ferrous plate beneath the chart. In the illustration, it is set opposite buoy "3HC", near the 20 minute elapsed time position.

I claim:

1. A navigation instrument for measuring the progress of a vessel relative to a designated track, comprising:
    a ferrous baseplate;
    a navigation chart;
    a transparent tracking plate having a trackline marked thereon; and
    a transparent overlay plate having a navigation grid marked thereon with said grid comprising time marked lines defined by straight rows of dots emanating from a point beyond the lower left edge of said transparent overlay plate, the horizontal spacing between said dots being proportional to the speed of said vehicle and the vertical spacing of said dots being proportional to the distance traveled by said vehicle, such that the intersection of a timeline with said trackline in said transparent trackline plate defines the position of said vehicle on said navigation chart at the time represented by the said timeline;
    said navigation chart being manually positioned on said ferrous base plate; said transparent trackline plate being manually positioned over said navigation chart and affixed by magnetic means to said ferrous baseplate; and said transparent overlay plate being manually positioned over said transparent trackline plate and affixed by magnetic means to said ferrous base plate.

2. A navigation instrument, as recited in claim 1, further comprising a transparent direction line plate having a direction line marked thereon, with said direction line plate being manually positioned perpendicular to said trackline plate, and affixed by magnetic means to said ferrous plate.

3. A navigation instrument, as recited in claim 1, further comprising a transparent compass rose plate manually positioned on and centered on a point where said direction line intersects a meridian line on said navigation chart, such that the north direction on said compass rose plate is angularly offset from the said meridian line by the magnetic variation; said compass rose plate being affixed by magnetic means to said ferrous base plate.

* * * * *